(12) United States Patent
Liu

(10) Patent No.: US 7,623,610 B2
(45) Date of Patent: Nov. 24, 2009

(54) METHOD FOR DETERMINING QPSK MODULATION SEQUENCE OF A DOWNLINK SYNCHRONIZATION CODE

(75) Inventor: Jiwu Liu, Shanghai (CN)

(73) Assignee: Spreadtrum Communications Inc., George Town, Grand Cayman (KY)

( * ) Notice: Subject to any disclaimer, the term of this patent is extended or adjusted under 35 U.S.C. 154(b) by 610 days.

(21) Appl. No.: 11/299,170

(22) Filed: Dec. 9, 2005

(65) Prior Publication Data
US 2006/0222133 A1 Oct. 5, 2006

(30) Foreign Application Priority Data
Apr. 1, 2005 (CN) ........................ 2005 1 0024827

(51) Int. Cl.
*H04L 7/04* (2006.01)
(52) U.S. Cl. ..................................................... 375/362
(58) Field of Classification Search ................ 375/130, 375/140, 145, 147, 149, 316, 340, 354, 362–367, 375/335, 342, 503, 509–515
See application file for complete search history.

(56) References Cited

U.S. PATENT DOCUMENTS

| | | | | |
|---|---|---|---|---|
| 7,027,495 B2* | 4/2006 | Demir et al. | ................. | 375/150 |
| 7,082,108 B2* | 7/2006 | Hwang et al. | ............... | 370/311 |
| 7,466,684 B2* | 12/2008 | Chang | ........................ | 370/350 |
| 2003/0076812 A1* | 4/2003 | Benedittis | ................... | 370/350 |
| 2005/0107061 A1* | 5/2005 | Grieco et al. | ............... | 455/313 |
| 2007/0104252 A1* | 5/2007 | Jang | .......................... | 375/147 |
| 2007/0140203 A1* | 6/2007 | Qiao | ......................... | 370/342 |

\* cited by examiner

*Primary Examiner*—Tesfaldet Bocure

(57) ABSTRACT

A method is provided for determining the modulation sequence of the downlink synchronization codes. The method comprises: the method comprises a three step process: step one is to measure the phase of the downlink synchronization code. Step two is to generate an accurate of the phase of the downlink synchronization code by removing the frequency drift effect, step three is to determine whether the sequence S1 or S2 is finally detected. The method allows for high accuracy to be achieved for determination of the modulation sequence of the downlink synchronization codes.

5 Claims, 2 Drawing Sheets

METHOD FOR DETERMINING QPSK MODULATION SEQUENCE OF A DOWNLINK SYNCHRONIZATION CODE

TECHNICAL FIELD OF THE INVENTION

The present invention relates in general to mobile communication technology and more specifically, to a method for determining the QPSK modulation sequence of consecutive SYNC-DL (Synchronous Downlink) codes in the low chip option of Universal Mobile Telecommunication System (UMTS) Time Division Duplex (TDD) and TD-SCDMA.

DESCRIPTION OF THE RELATED ART

In a digital cellular mobile communication system, after a mobile handset is turned on, an initial cell search is performed. Some purposes of the cell search are to select a suitable working frequency and to obtain downlink synchronization between the mobile handset and a base station at the working frequency. In a cellular mobile communication system, a pilot channel generally performs the downlink synchronization. In this way, the mobile handset correctly receives a message sent by the base station.

An objective of synchronization is to be able to receive data of a broadcast channel (BCH) which is carried by a primary common control physical channel (P-CCPCH) in Timeslot 0 of a superframe.

Presently, two difference sequences of the so-called SYNC-DL code modulation are specified for four sequential DwPTS (Downlink Pilot Timeslot) in a superframe. See 3GPP TS 25.223 v5.1.0 Sec. 9.1.1. A first sequence, S1, indicates that there is a P-CCPCH carrying a BCH in the next superframe; a second sequence, S2, indicates that there is no such P-CCPCH in the next superframe. Where sequence S1 of the modulation of the SYNC-DL codes of a superframe is found, the data from the BCH can be read from the P-CCPCH of the next superframe.

FIG. 1 illustrates the time frame structure for the 1.28 Mcps low clip rate option of a wireless system as currently specified by 3GPP. Ten (10) ms frames are divided into two sub-frames of five (5) ms each. Each sub-frame includes seven (7) timeslots and a separate area for uplink and downlink synchronization (SYNC) signals. Each Timeslot 0-6 is configured to receive communication data symbols and an identifying midamble code. Timeslot 0 is always a downlink (DL) slot. Timeslot 1 is always an uplink (UL) slot. Timeslots 2-6 are configurable for either UL or DL usage.

Between Timeslot 0 and Timeslot 1, there exists a ninety-six (96) chip long Downlink Pilot Timeslot (DwPTS), a ninety-six (96) chip long guard period (GP) and a one-hundred sixty (160) chip long uplink pilot timeslot (UpPTS). Within the DwPTS there is a thirty-two (32) chip long guard period and a 64 chip Synchronous (SYNC-DL) code section.

Quadrature phase shift keying (QPSK) modulation is used on the SYNC-DL codes. In each sub-frame, the midamble code in the DL Timeslot 0 provides a QSPK phase reference of the SYNC-DL code in the DwPTS. Accordingly, once the midamble code of Timeslot 0 is determined, the QPSK modulation of a SYNC-DL code in the DwPTS of the sub-frame can be ascertained.

Four consecutive phases (phase quadruple) of the SYNC-DL are used to indicate the presence of the P-CCPCH in the following 4 sub-frames. In case the presence of a P-CCPCH is indicated, the next following sub-frame is the first sub-frame of the interleaving period. As QPSK is used for the modulation of the SYNC-DL, the phases 45, 135, 225, and 315 degrees are used.

The total number of different phase quadruples is 2 (S1 and S2). A quadruple always starts with an even system frame number ((SFN mod 2)=0). Table below is showing the quadruples and their meaning.

| Name | Phase quadruple | Meaning |
|---|---|---|
| S1 | 135, 45, 225, 135 | There is a P-CCPCH in the next 4 sub-frames |
| S2 | 315, 225, 315, 45 | There is no P-CCPCH in the next 4 sub-frames |

For the purpose of determining P-CCPCH position and then reading of a full BCH message, the QPSK modulation of consecutive SYNC-DL sequences needs to be detected.

A typical process for determining the phase of the QPSK modulation that is on the SYNC-DL code over multiple sub-frames is as follows: (1) measure SYNC-DL sequence phase, denoted as $\phi_S$, (2) generate the QPSK modulation $\phi$ of the downlink synchronization code, SYNC-DL sequences by using a decision device based on $\phi_S$ according to the relationship detailed below.

$$\phi = \begin{cases} 45°, & 0° \leq \phi_S < 90° \\ 135°, & 90° \leq \phi_S < 180° \\ 225°, & 180° \leq \phi_S < 270° \\ 315°, & 270° \leq \phi_S < 360° \end{cases}$$

Based on QPSK modulation $\phi$ of four or more consecutive SYNC-DL code, a decision circuit determines whether or not a selected sequence has been detected, such as the S1 sequence referenced above. When the selected modulation sequence is detected, the decision circuit identifies the start of a superframe in which BCH data is carried on the P-CCPCH in Timeslots 0. This is currently specified in 3GPP as the next superframe following an S1 sequence of modulations of the DwPTS.

The above mentioned method does not take into consideration the frequency drift between the local oscillator and that of the base station. In "real world" transmissions, carrier frequency offset is nearly impossible to avoid. Furthermore, since the SYNC-DL code is about 500 chips in length away from the midamble code in Timeslot 0, a frequency drift as small as 200 Hz can generate a corresponding phase drift up to 28°.

In view of the above mentioned problem, there is a need for a method capable of detecting the modulation sequence in an efficient and accurate manner.

SUMMARY OF THE INVENTION

The present invention discloses a method for determining the phase of QPSK modulation of the downlink synchronization code in an accurate manner by removing the frequency drift effect.

The present invention comprises of the steps of: measuring the phase of the downlink synchronization code, generating a replica of the phase of the SYNC-DL code by removing the frequency drift effect; and, determining whether the phase sequence S1 or S2 is detected.

DETAILED DESCRIPTION OF THE PREFERRED EMBODIMENT

Figure 1:
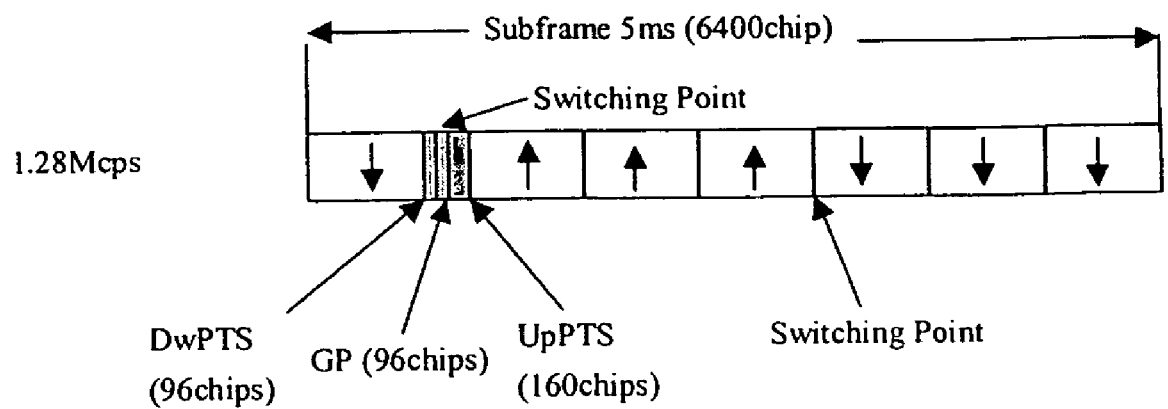
FIG. 1 is a burst diagram illustrating the frame structure for the 1.28 Mcps option of a 3GPP system.

While the specification concludes with claims defining the features of the invention that are regarded as novel, it is believed that the invention will be better understood from a consideration of the following description in conjunction with the drawing figures.

Figure 2:
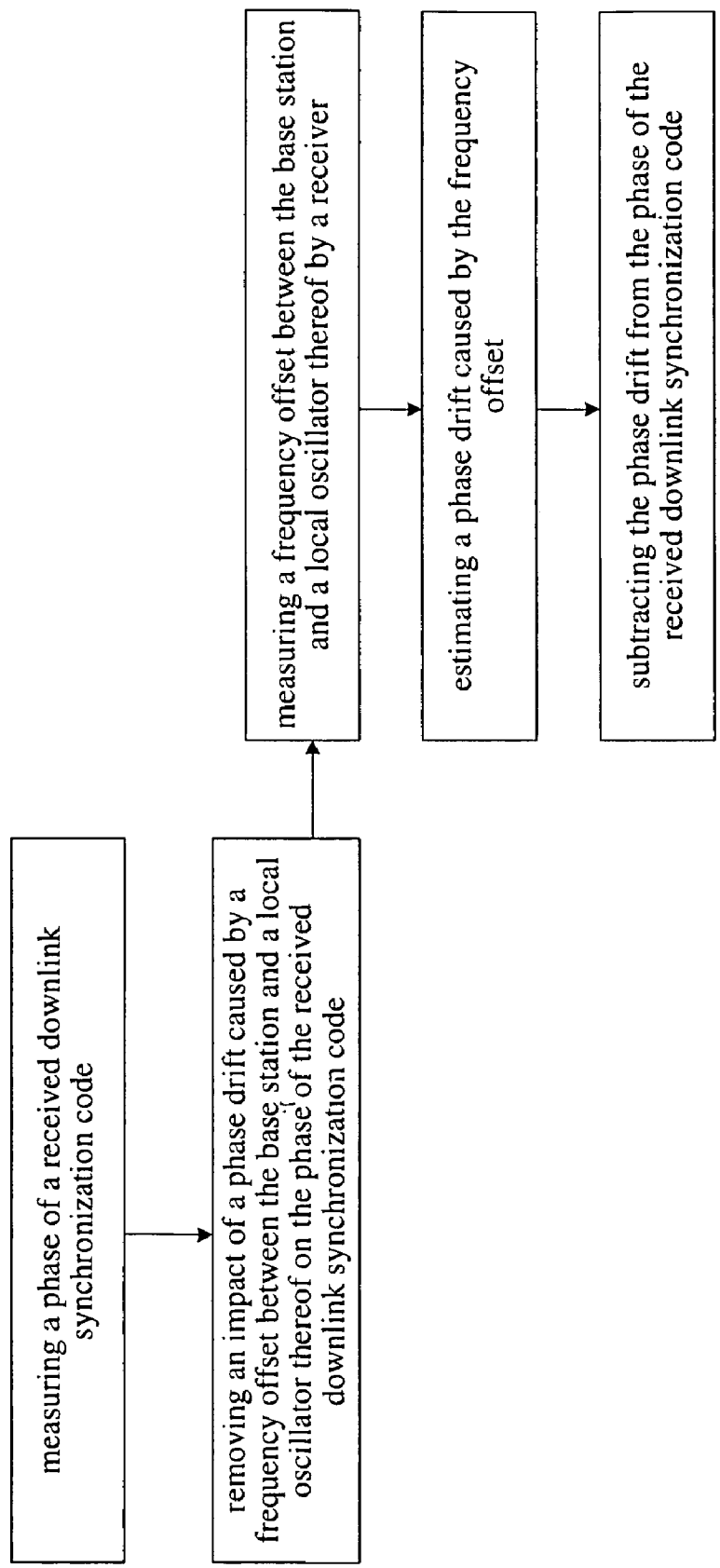
FIG. 2 is a flow chart of a method of determining a phase modulation sequence of a downlink synchronization code sent by a base station according to a preferred embodiment of the present invention.

Referring to FIG. 2 of the drawings, a method of determining a phase modulation sequence of a downlink synchronization code sent by a base station according to a preferred embodiment of the present invention comprises steps of: (a) measuring a phase of a received downlink synchronization code, and (b) removing an impact of a phase drift caused by a frequency offset between the base station and a local oscillator thereof on the phase of the received downlink synchronization code, wherein step (b) comprises steps of: (b.1) measuring a frequency offset between the base station and a local oscillator thereof by a receiver, (b.2) estimating a phase drift caused by the frequency offset, and (b.3) subtracting the phase drift from the phase of the received downlink synchronization code, which will be detailed explained hereinafter.

One embodiment of the method of detecting the modulation sequence of SYNC-DL codes can be implemented as follows: step one is to measure the phase of SYNC-DL codes $\phi_S$; step two is to remove the negative impact of the frequency drift by subtracting from the phase of SYNC-DL codes $\phi_S$ the phase drift $\Delta\phi_S$. The result is the QPSK modulation of the SYNC-DL codes which is denoted as $\phi$. Here the phase drift $\Delta\phi_S$ is defined by the expression of $\Delta\phi_S \approx 360^* \Delta f^*(500/128000) \approx f^* 0.14$ where $\Delta f$ is the frequency offset between the local oscillator and that of base station and is measured in the UE receiver. Step three is detection of the appropriate modulation sequence S1 or S2. When an appropriate modulation sequence of SYNC-DL codes is detected, such as sequence S1 above, the mobile handset can then read data sent by the base station in a broadcast channel (BCH) which is carried on a P-CCPCH in the Timeslots 0 of a superframe which then enables the mobile handset to proceed with bidirectional communication with the base station which sent the BCH data.

In view of the current specified 1.28 Mcps option, another embodiment of the invention may be implemented as follows: as the duration of four or more consecutive subframes is only about 20 ms long, in such a short period, the frequency offset of the consecutive subframes can be regarded as a constant, accordingly their respective phase drift may be considered a constant. Thus, the phase difference between the two SYNC-DL codes in successive subframes can remove the impact of the frequency drift.

It is appreciated that the difference sequence for the sequence of SYNC-DL code QPSK modulation (S1 and S2) is ascertained in the system. The decision process works in the following manner:

sequence S1 over the current four or more consecutive SYNC-DL codes is identified within the following two scenarios, one of which is when sequence S1 is detected over the previous four or more consecutive SYNC-DL code and in the meantime the sequence dS is detected as dS1_a: {0, 270, 180, 270}, another case is that a sequence S2 is identified over the previous four or more consecutive SYNC-DL codes and in the meantime the sequence dS is detected as dS1_b: {90, 270, 180, 270}.

Sequence S2 over the current four or more consecutive SYNC-DL codes is identified within the following two scenarios, one of which is when sequence S1 is detected over the previous four or more consecutive SYNC-DL code and in the meantime the sequence dS is detected as dS2_a: {180, 270, 90, 90}, another case is that a sequence S2 is identified over the previous four or more consecutive SYNC-DL codes and in the meantime the sequence dS is detected as dS2_b: {270, 270, 90, 90}.

In this embodiment, in order to identify the S1, S2 sequence, the following steps are performed: first, measure the phase of the current SYNC-DL code which is denoted as $\phi_S$, then compute the phase difference between $\phi_S$ and the former SYNC-DL code, the result is denoted as $\Delta\phi_S$, next $\Delta\phi$ is generated in decision device based on $\Delta\phi_S$ according to the relationship detailed below.

$$\Delta\phi = \begin{cases} 0°, & -45° \le \Delta\phi_S < 45° \\ 90°, & 45° \le \Delta\phi_S < 135° \\ 180°, & 135° \le \Delta\phi_S < 225° \\ 270°, & 225° \le \Delta\phi_S < 315° \end{cases}$$

Thus, when the phase of the N consecutive SYNC-DL codes is measured and obtained, a sequence (denoted as dS) of $\Delta\phi$ of (N−1) consecutive SYNC-DL codes may be generated.

The sequence dS is input to a decision device to make a determination as to whether sequence S1 or S2 is appropriate. In the decision device, a sequence S1 over the current four or more consecutive SYNC-DL codes is identified within the following two scenarios, one of which is when sequence S1 is detected over the previous four or more consecutive SYNC-DL codes. In the meantime, the sequence dS is detected as dS1_a: {0, 270, 180, 270}. Another case is that a sequence S2 is identified over the previous four or more consecutive SYNC-DL codes and in the meantime the sequence dS is detected as dS1_b: {90, 270, 180, 270}.

In the decision device, a sequence S2 over the current four or more consecutive SYNC-DL codes is identified within the following two scenarios, one of which is when sequence S1 is detected over the previous four or more consecutive SYNC-DL code and in the meantime the sequence dS is detected as dS2_a: {180, 270, 90, 90}, another case is that a sequence S2 is identified over the previous four or more consecutive SYNC-DL codes and in the meantime the sequence dS is detected as dS2_b: {270, 270, 90, 90}.

With the present invention, it can be determined whether or not a selected sequence has been detected, such as the S1 sequence referenced above. When the selected modulation sequence is detected, superframe timing (SFT) is output to identify the start of a superframe in which BCH data is carried on the P-CCPCH in Timeslots 0. This is currently specified in 3GPP as the next superframe following an S1 sequence of modulations of the downlink synchronization code. This enables reading of a full Broadcast Channel message.

While the invention has been described in the context of a preferred embodiment, it will be apparent to those skilled in the art that the present invention may be modified in numerous ways and may assume many embodiments other than that specifically set out and described above. Accordingly, it is intended by the appended claims to cover all modifications of the invention which fall within the true spirit and scope of the invention.

What is claimed is:

1. A method of determining a phase modulation sequence of a downlink synchronization code sent by a base station, comprising steps of:
   (a) measuring a phase of a received downlink synchronization code, and
   (b) removing an impact of a phase drift caused by a frequency offset between the base station and a local oscillator thereof on the phase of the received downlink synchronization code, so that the phase modulation sequence of the downlink synchronization code sent by the base station is determined,
   wherein the step (b) comprises steps of:
      (b.1) measuring a frequency offset between the base station and a local oscillator thereof by a receiver,
      (b.2) estimating a phase drift caused by the frequency offset, and
      (b.3) subtracting the phase drift from the phase of the received downlink synchronization code, so that the phase modulation sequence of a downlink synchronization code sent by the base station is determined.

2. The method of determining a phase modulation sequence of a downlink synchronization code sent by a base station, as recited in claim 1, wherein
   in step (b.2), the phase drift caused by the frequency offset is estimated by a expression of $\Delta\phi_S \approx 360 * \Delta f * (500/128000) \approx f * 0.14$, wherein $\Delta\phi_S$ is the phase drift and $\Delta f$ is the frequency offset.

3. A method of determining a phase modulation sequence of a downlink synchronization code sent by a base station, comprising steps of:
   (a) measuring a phase of a received downlink synchronization code, and
   (b) removing an impact of a phase drift caused by a frequency offset between the base station and a local oscillator thereof on the phase of the received downlink synchronization code, so that the phase modulation sequence of the downlink synchronization code sent by the base station is determined,
   wherein the step (b) comprises steps of:
      (b.1') calculating a phase difference of the successive downlink synchronization codes sent by the base station so as to obtain a sequence of phase difference of the downlink synchronization code sent by the base station,
      (b.2') calculating a phase difference of the successive received downlink synchronization codes by the receiver so as to obtain a sequence of phase difference of the received downlink synchronization code by the receiver, and
      (b.2') identifying whether the sequence of phase difference of the downlink synchronization code sent by the base station within the sequence of phase difference of the received downlink synchronization code by the receiver, so that the phase modulation sequence of a downlink synchronization code sent by the base station is determined.

4. A method of determining a phase modulation sequence of a downlink synchronization code sent by a base station whether to be S1 or S2, wherein S1 and S2 are two different phase modulation sequences of the downlink synchronization code, comprising steps of:
   (a) measuring a phase of a received downlink synchronization code,
   (b) removing an impact of a phase drift caused by a frequency offset between the base station and a local oscillator thereof on the phase of the received downlink synchronization code, so that the phase modulation sequence of the downlink synchronization code sent by the base station is determined, and
   (c) determining whether the phase modulation sequence of the downlink synchronization code is S1 or S2,
   wherein the step (b) comprises steps of:
      (b.1) measuring a frequency offset between the base station and a local oscillator thereof by a receiver,
      (b.2) estimating a phase drift caused by the frequency offset, and
      (b.3) subtracting the phase drift from the phase of the received downlink synchronization code, so that the phase modulation sequence of a downlink synchronization code sent by the base station is determined.

5. The method of determining a phase modulation sequence of a downlink synchronization code sent by a base station whether to be S1 or S2, wherein S1 and S2 are two different phase modulation sequences of the downlink synchronization code, as recited in claim 4, wherein
   in step (b.2), the phase drift caused by the frequency offset is estimated by a expression of $\Delta\phi_S \approx 360 * \Delta f * (500/128000) \approx f * 0.14$, wherein $\Delta\phi_S$ is the phase drift and $\Delta f$ is the frequency offset.

* * * * *